United States Patent
Yamazaki et al.

(10) Patent No.: US 6,790,522 B2
(45) Date of Patent: Sep. 14, 2004

(54) MAGNETIC RECORDING MEDIUM

(75) Inventors: Nobuo Yamazaki, Kanagawa (JP); Hitoshi Noguchi, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 64 days.

(21) Appl. No.: 10/252,417

(22) Filed: Sep. 24, 2002

(65) Prior Publication Data

US 2003/0072969 A1 Apr. 17, 2003

(30) Foreign Application Priority Data

Sep. 28, 2001 (JP) .................................. P.2001-301182

(51) Int. Cl.$^7$ .............................................. G11B 5/712
(52) U.S. Cl. ................................ 428/329; 428/694 BH
(58) Field of Search ...................... 428/329; 11/694 BH

(56) References Cited

U.S. PATENT DOCUMENTS 5,219,670 A * 6/1993 Ohno et al. .............. 428/694 B
5,670,245 A * 9/1997 Isobe et al. ................. 428/216
5,766,763 A * 6/1998 Kurisu et al. ............... 428/403

FOREIGN PATENT DOCUMENTS

JP 56-155023 * 12/1981

* cited by examiner

Primary Examiner—Stevan A. Resan
(74) Attorney, Agent, or Firm—Sughrue Mion, PLLC

(57) ABSTRACT

A magnetic recording medium comprising a support having provided thereon a magnetic layer containing a barium ferrite powder dispersed in a binder, wherein the concentration of Ba of the extract obtained by the following condition is 20 ppm or less per m$^2$ of the magnetic recording medium: condition: 0.05 m$^2$ of the magnetic recording medium is arbitrarily cut out and put in a 200 ml beaker with 100 ml of distilled water, the beaker is covered with a watch glass and retained in a constant temperature bath at 75° C. for 3 hours.

3 Claims, No Drawings

MAGNETIC RECORDING MEDIUM

FIELD OF THE INVENTION

The present invention relates to a coating type high capacity magnetic recording medium (i.e., a high capacity magnetic recording particulate medium).

BACKGROUND OF THE INVENTION

Magnetic heads working with electromagnetic induction as the principle of operation (an induction type magnetic head) are conventionally used and spread. However, magnetic heads of this type are approaching their limit for use in the field of higher density recording and reproduction. That is, it is necessary to increase the number of winding of the coil of a reproduction head to obtain larger reproduction output, but when the winding number is increased, the inductance increases and the resistance at high frequency heightens, as a result, the reproduction output lowers.

In recent years, reproduction heads which work with MR (magneto-resistance) as the principle of operation are proposed and come to be used in hard discs. As compared with the induction type magnetic head, several times of reproduction output can be obtained by the MR head. Further, since an induction coil is not used in the MR head, noises generated from instruments, e.g., impedance noises, are largely reduced, therefore, it becomes possible to obtain a great S/N ratio by lowering the noise coming from magnetic recording media. In other words, good recording and reproduction can be done and high density recording characteristics can be drastically improved by lessening the noise of magnetic recording media hiding behind the instruments.

It is known that a magnetic recording medium using a barium ferrite (hereinafter referred to as "Ba ferrite") magnetic powder is excellent in the stability of magnetic characteristics resulting from the chemical stability of a magnetic powder as compared with a magnetic recording medium using a metallic magnetic powder. On the other hand, a high capacity magnetic recording medium shows a tendency to use a Ba ferrite of finer particles to reduce noises.

When a magnetic recording medium using a fine particle Ba ferrite powder is stored under a high temperature and high humidity condition, drawbacks arise in the stability of recording and reproduction, such as the reduction of output, the dropout and the clogging of a head.

SUMMARY OF THE INVENTION

An object of the present invention is to provide a magnetic recording medium which is free of head clogging, not accompanied with the reduction of output, less in the dropout and excellent in the stability of recording and reproduction even when the magnetic recording medium is stored under a high temperature and high humidity condition.

The present invention has been achieved by a magnetic recording medium comprising a support having provided thereon a magnetic layer containing a barium ferrite powder dispersed in a binder, wherein the concentration of Ba of the extract obtained by the following condition is 20 ppm or less per m$^2$ of the magnetic recording medium:

condition: 0.05 m$^2$ of the magnetic recording medium is arbitrarily cut out and put in a 200 ml beaker with 100 ml of distilled water, the beaker is covered with a watch glass and retained in a constant temperature bath at 75° C. for 3 hours.

A preferred mode of the present invention is as follows.

(1) The magnetic recording medium, wherein the specific surface area of the barium ferrite powder is 40 m$^2$/g or higher.

DETAILED DESCRIPTION OF THE INVENTION

The present invention was accomplished on the basis of the fact that the present inventors specified that the generation of Ba-containing foreign matters on the surface of a magnetic recording medium was the cause of nonconformities, e.g., the reduction of output, the increase of dropout and clogging of a head, caused by storing a magnetic recording medium containing a Ba ferrite powder under high temperature and high humidity conditions. The Ba-containing foreign matters are thought to have been supplied by the Ba ferrite powder. As the Ba-containing foreign matters, a halide salt and a fatty acid salt are exemplified.

By restricting the concentration of Ba extracted from a magnetic recording medium by the condition as specified above to preferably 20 ppm/m$^2$ or less, more preferably 10 ppm/m$^2$ or less, and reducing the Ba-containing foreign matters, the present invention can improve nonconformities, e.g., the reduction of output, the increase of dropout and clogging of a head.

The method of measuring the concentration of Ba is note specially limited and, e.g., ICP (inductive coupling plasma) spectral analysis method is used.

The concentration of Ba in the present invention means the value which can be obtained by using a magnetic recording medium throughout the period from the initial stage to the endurable final stage of the product.

The unit of Ba concentration ppm/m$^2$ is the concentration of the extract which is extracted on the above condition from one square meter of a magnetic recording medium, which is the mass parts (i.e., the weight parts) of the Ba atom contained in 1,000,000 mass parts of the extract measured.

An effective means to make Ba concentration 20 ppm/m$^2$ or less is to make the specific surface area $S_{BET}$ of a Ba ferrite powder 40 m$^2$/g or less, but when the $S_{BET}$ is less than 40 m$^2$/g, low noise which is necessary to a high capacity medium cannot be obtained. Further, when the $S_{BET}$ is more than 80 m$^2$/g, it is difficult to make Ba concentration 20 ppm/m$^2$ or less even with the method described later.

Accordingly, $S_{BET}$ of a Ba ferrite powder is preferably from 40 to 80 m$^2$/g.

The following means can be exemplified as the means for restricting Ba concentration to the range according to the present invention, but it should not be construed as the means are limited thereto.

(1) Ba ferrite powders (or particles) are subjected to washing with weak acid or water.

This treatment has an effect of removing Ba which might dropout of a magnetic recording medium in advance by intensifying washing of a Ba ferrite. As the acid to be used, an acetic acid is exemplified.

(2) Ba ferrite powders (or particles) are subjected to surface treatment.

This treatment has an effect of making Ba difficult to drop out of a magnetic recording medium by covering the surfaces of the Ba ferrite particles with other materials. As the covering substances, inorganic and organic compounds are used. Oxides or hydroxides of Si, Al, P and the like, various kinds of silane coupling agents, and various kinds of titanium coupling agents are representative examples. The amount of these surface treating compounds is from 0.1 to 10 mass % (i.e., weight %) based on the amount of the Ba ferrite powder. The surface treatment may be performed by adding surface treating compounds to a coating solution in the preparation of a magnetic coating solution, or the surfaces of Ba ferrite particles may be treated in advance.

(3) The kind and the amount of the functional groups of a binder resin in which a Ba ferrite powder is dispersed are arbitrarily selected.

This treatment has an effect of making Ba difficult to drop out of a magnetic recording medium by the adsorption of the functional groups of a binder onto the surfaces of Ba ferrite particles. The binder resins are described in detail later. The pH of a Ba ferrite powder is also important for dispersion, and it is in general from about 4 to about 12. The optimal value of pH is dependent upon the binder resin. Taking the chemical stability and the storage stability of a magnetic recording medium into consideration, pH of from about 6 to about 11 is selected. The water content in a Ba ferrite powder also affects dispersion. The optimal value of the water content is dependent upon the dispersion medium and the binder resin, and the water content of from 0.01 to 2.0 mass % is selected in general.

(4) The degree of dispersion is adjusted when a coating solution containing a Ba ferrite powder is prepared so as not to perform excessive dispersion.

This treatment is supposed to be able to restrain the increase of Ba concentration from a magnetic recording medium by preventing Ba ferrite particles from cleaving in a dispersing step and Ba from dropping out of new surfaces.

It is difficult in practice to make the amount of extraction 20 ppm/m$^2$ or less by one means of the above methods, therefore, it is preferred to use some means in combination.

The magnetic recording medium according to the present invention is described with every constituent element below.

Magnetic Layer

A magnetic layer may be provided on either one side of a support or may be provided on both sides of a support of the magnetic recording medium in the present invention. When a magnetic layer is provided on a lower layer, the magnetic layer (also called an upper layer or an upper magnetic layer) may be coated after the lower layer is coated and while the lower layer is still wet (W/W coating) or the magnetic layer may be coated after the lower layer coated is dried (W/D coating). Simultaneous or successive coating is preferred in view of the productivity but wet-on-dry coating can be sufficiently used in the case of a disc. In the multilayer constitution according to the present invention, since the upper layer and the lower layer can be formed by simultaneous or successive coating (W/W coating), a surface treatment step, e.g., a calendering step, can be utilized effectively and surface roughness of the upper magnetic layer can be improved even the layer is an ultra-thin layer.

Ba Ferrite Powder

The examples of barium ferrite powders which are used in a magnetic layer according to the present invention include substitution products of the constituent element, e.g., Co substitution products. Specifically, a magnetoplumbite type barium ferrite, a magnetoplumbite type ferrite having covered the particle surfaces with a spinel, and a magnetoplumbite type barium ferrite partially containing a spinel phase are exemplified. Barium ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, barium ferrite powders containing the following elements, e.g., Co—Zn, Co—Ti, Co—Ti—Zr, Co—Ti—Zn, Ni—Ti—Zn, Nb—Zn—Co, Sb—Zn—Co and Nb—Zn can be used. According to starting materials and producing processes, specific impurities may be contained.

The average tabular ratio (an arithmetic mean of tabular diameter/tabular thickness) of Ba ferrite powders is preferably from 1 to 15, more preferably from 1 to 7. If the tabular ratio is small, the packing density in a magnetic layer becomes high, which is preferred but satisfactory orientation cannot be obtained. When the tabular ratio is higher than 15, noise increases due to stacking among particles. $S_{BET}$ of the particles having diameters within this range is from 10 to 100 m$^2$/g. $S_{BET}$ nearly coincides with the value obtained by arithmetic operation value from tabular diameter and tabular thickness. Distribution of tabular diameter/tabular thickness is generally preferably as narrow as possible. Distributions of specific surface areas in numerical values can be compared by measuring TEM photographs of 500 particles selected randomly. The distributions are in many cases not regular distributions, however, a variation coefficient expressed by the standard deviation to an average tabular diameter by computation (a/average tabular diameter or average tabular thickness) is generally from 0.1 to 2.0. A variation coefficient is preferably from 0.1 to 1.0, and more preferably from 0.1 to 0.5. For obtaining narrow particle size distribution, it is efficient to make a particle-forming reaction system homogeneous as far as possible, and particles formed are subjected to distribution-improving treatments as well. For example, a method of selectively dissolving ultra-fine particles in an acid solution is also known. The average particle volume of the hexagonal Ba ferrite fine powders is from 1,000 to 10,000 nm$^3$, preferably from 1,500 to 8,000 nm$^3$, and more preferably from 2,000 to 8,000 nm$^3$.

The coercive force (Hc) measured in magnetic powders of generally from about 40 to about 400 kA/m can be produced. Higher Hc is advantageous for high density recording but it is restricted by the capacity of a recording head. Magnetic powders in the present invention preferably have Hc of from about 159 to about 397 kA/m, and more preferably from 159 to 320 kA/m. When the saturation magnetization of a head is more than 1.4 tesla, Hc is preferably 175 kA/m or more. Hc can be controlled by particle sizes (tabular diameter/tabular thickness), the kinds and amounts of elements contained, the substitution sites of the elements, and the reaction conditions of particle formation. Saturation magnetization $\sigma_s$ is from 40 to 80 A·m$^2$/kg. Saturation magnetization $\sigma_s$ has inclination of becoming smaller as particles become finer. For improving $\sigma_s$, it is well known to make a composite of a magnetoplumbite ferrite with a spinel ferrite, to select the kinds and the amounts of elements to be contained, or W-type hexagonal Ba ferrites can also be used. When magnetic powders are dispersed, the particle surfaces of magnetic particles may be treated with substances compatible with the dispersion media and the polymers. Producing methods of Ba ferrite powders include a glass crystallization method comprising the steps of blending metallic oxides which substitute a barium oxide, an iron oxide and an iron, with a boron oxide as a glass-forming material so as to make a desired ferrite composition, melting and then quenching the mixture to obtain an amorphous product, subjecting the obtained amorphous product to reheating, washing and then pulverizing to obtain a barium ferrite crystal powder; a hydrothermal reaction method comprising the steps of neutralizing a solution of a metallic salt having barium ferrite composition with an alkali, removing the byproducts produced, heating the liquid phase at 100° C. or more, subjecting the heated product to washing, drying and then pulverizing, to thereby obtain a barium ferrite crystal powder; and a coprecipitation method comprising the steps of neutralizing a solution of a metallic salt having barium ferrite composition with an alkali, removing the byproducts produced and drying, treating the system at 1,100° C. or less, and then pulverizing the product subjected to heat treatment, to thereby obtain a barium ferrite crystal powder. Any of the above methods can be used in the present invention.

Nonmagnetic Layer

The lower layer is described in detail below. The constitution of the lower layer in the present invention is not particularly limited so long as it is substantially nonmagnetic but, in general, the lower layer comprises at least a resin, preferably a powder, e.g., an inorganic or organic powder dispersed in a resin. The inorganic powder is, in general, preferably a nonmagnetic powder but a magnetic powder can also be contained so long as the lower layer is substantially nonmagnetic.

Nonmagnetic powders can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred due to their small particle size distribution and various means for imparting functions, and titanium dioxide and alpha-iron oxide are more preferred. These nonmagnetic powders preferably have a particle size of from 0.005 to 2 $\mu$m. A plurality of nonmagnetic powders each having a different particle size may be combined, if necessary, or a single nonmagnetic powder having a broad particle size distribution may be employed so as to attain the same effect as such a combination. A particularly preferred particle size of nonmagnetic powders is from 0.01 to 0.2 $\mu$m. In particular, when nonmagnetic powders are granular metallic oxides, the average particle size of the granular metallic oxides is preferably 0.08 $\mu$m or less, and when nonmagnetic powders are acicular metallic oxides, the long axis length of the acicular metallic oxides is preferably 0.3 $\mu$m or less, and more preferably 0.2 $\mu$m or less. Nonmagnetic powders for use in the present invention have a tap density of from 0.05 to 2 g/ml, and preferably from 0.2 to 1.5 g/ml; a water content of generally from 0.1 to 5 mass %, preferably from 0.2 to 3 mass %, and more preferably from 0.3 to 1.5 mass %; and a pH value of generally from 2 to 11, and particularly preferably from 5.5 to 10.

Nonmagnetic powders for use in the present invention have a specific surface area ($S_{BET}$) of from 1 to 100 m$^2$/g, preferably from 5 to 80 m$^2$/g, and more preferably from 10 to 70 m$^2$/g; a crystallite size of from 0.004 to 1 $\mu$m, and more preferably from 0.04 to 0.1 $\mu$m; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, and preferably from 3 to 6. The figure of nonmagnetic powders may be any of acicular, spherical, polyhedral and tabular figures. Nonmagnetic powders preferably have a Mohs' hardness of from 4 to 10. The SA (stearic acid) adsorption amount of nonmagnetic powders is from 1 to 20 $\mu$mol/m$^2$, preferably from 2 to 15 $\mu$mol/m$^2$, and more preferably from 3 to 8 $\mu$mol/m$^2$. The pH value of nonmagnetic powders is preferably between 3 and 6. The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are preferred in the point of dispersibility, and $Al_2O_3$, $SiO_2$ and $ZrO_2$ are more preferred. These surface-covering agents can be used in combination or they may be used alone. Surface treatment may be performed by coprecipitation, alternatively, surface treatment of particles may be performed to be covered with alumina in advance, then the alumina-covered surface may be covered with silica, or vice versa, according to purposes. A surface-covered layer may be porous, if necessary, but a homogeneous and dense surface is generally preferred.

The specific examples of nonmagnetic powders for use in the lower layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DPN-500BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha K.K.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Tayca Corp.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A, and calcined products of them (manufactured by Ube Industries, Ltd.). Particularly preferred nonmagnetic powders are titanium dioxide and alpha-iron oxide.

By the incorporation of carbon blacks into the lower layer, a desired micro Vickers' hardness can be obtained, in addition to the well-known effects of capable of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring and acetylene blacks can be used as carbon blacks. Carbon blacks used in the lower layer should optimize the following characteristics according to the desired effects and sometimes more effects can be obtained by the combined use.

Carbon blacks for use in the lower layer according to the present invention have a specific surface area ($S_{BET}$) of from 100 to 500 m$^2$/g, and preferably from 150 to 400 m$^2$/g, a DBP oil absorption amount of from 20 to 400 ml/100 g, and preferably from 30 to 400 ml/100 g, a particle size of from 5 to 80 nm, preferably from 10 to 50 nm, and more preferably from 10 to 40 nm, pH of from 2 to 10, a water content of from 0.1 to 10%, and a tap density of from 0.1 to 1 g/ml. The specific examples of carbon blacks for use in the lower layer according to the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface may be graphitized before use. Carbon blacks may be previously dispersed in a binder before being added to a coating solution. Carbon blacks can be used within the range not exceeding 50 mass % (i.e., weight %) based on the above inorganic powders and not exceeding 40 mass % based on the total mass (i.e., the total weight) of the nonmagnetic layer. These carbon blacks can be used alone or in combination. Regarding carbon blacks for use in the present invention, e.g., compiled by Carbon Black Association, *Carbon Black Binran* (*Handbook of Carbon Blacks*) can be referred to.

Organic powders can be used in the lower layer according to the purpose. The examples of organic powders include an acryl styrene resin powder, a benzoguanamine resin powder, a melamine resin powder and a phthalocyanine pigment. Besides the above, a polyolefin resin powder, a polyester resin powder, a polyamide resin powder, a polyimide resin powder, and a polyethylene fluoride resin powder can also be used. The producing methods of these resin powders are disclosed in JP-A-62-18564 and JP-A-60-255827 (the term "JP-A" as used herein means an "unexamined published Japanese patent application").

Binder resins, lubricants, dispersants, additives, solvents, dispersing methods, and others used for the magnetic layer described below can be used in the lower layer. In particular, with respect to the amounts and the kinds of binder resins, additives, and the amounts and the kinds of dispersants, well-known prior art techniques regarding the magnetic layer can be applied to the lower layer.

Binder

Conventionally well-known thermoplastic resins, thermosetting resins, reactive resins and mixtures of these resins are used as a binder in the present invention. Thermoplastic resins having a glass transition temperature of from −100 to 150° C., a number average molecular weight of from 1,000 to 200,000, preferably from 10,000 to 100,000, and a polymerization degree of about 50 to about 1,000 can be used in the present invention.

The examples of such resins include polymers or copolymers containing as a constituting unit the following compounds, e.g., vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins. The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyol and polyisocyanate, and mixtures of polyurethane and polyisocyanate. These resins are described in detail in *Plastic Handbook*, published by Asakura Shoten. It is also possible to use well-known electron beam-curable type resins in each layer. The examples of these resins and producing methods are disclosed in detail in JP-A-62-256219. These resins can be used alone or in combination. The examples of preferred combinations include at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

As polyurethane resins, those having well-known structures can be used, e.g., polyester polyurethane, polyether polyurethane, polyether polyester polyurethane, polycarbonate polyurethane, polyester polycarbonate polyurethane, and polycaprolactone polyurethane. Concerning every binder shown above, it is preferred that at least one polar group selected from the following groups is introduced by copolymerization or addition reaction for the purpose of further improving dispersibility and durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$^2$, —N$^+$R$_3$ (R represents a hydrocarbon group), an epoxy group, —SH and —CN. As a result of examination, —SO$_3$M was preferred above all. The content of these polar groups is from $10^{-1}$ to $10^{-8}$ mol/g, and preferably from $10^{-2}$ to $10^{-6}$ mol/g.

The specific examples of these binders for use in the present invention include VAGH, VYHH, VMCH, VAGF, VAGD, VROH, VYES, VYNC, VMCC, XYHL, YXSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), PandexT-5105, T-R3080, T-5201, Burnock D-400, D-210-80, Crisvon 6109 and 7209 (manufactured by Dainippon Chemicals and Ink. Co., Ltd.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Kasei Corp.), Sunprene SP-150 (manufactured by Sanyo Chemical Industries Co. Ltd.), and Salan F310 and F210 (manufactured by Asahi Chemical Industry Co., Ltd.).

The amount of binders for use in a nonmagnetic layer and a magnetic layer according to the present invention is from 5 to 50 mass %, and preferably from 10 to 30 mass %, based on the amount of the nonmagnetic powder or the magnetic powder. When vinyl chloride resins are used as the binder, the amount is from 5 to 30 mass %, when polyurethane resins are used, the amount is from 2 to 20 mass %, and also it is preferred that polyisocyanate is used in an amount of from 2 to 20 mass % in combination with them. However, for instance, when head corrosion is caused by a slight amount of chlorine due to dechlorination, it is possible to use polyurethane alone or a combination of polyurethane and isocyanate alone. When polyurethane is used in the present invention, it is preferred that the polyurethane has a glass transition temperature of from −50 to 150° C., preferably from 0 to 100° C., and more preferably from 30 to 90° C., breaking extension of from 100 to 2,000%, breaking stress of from 0.05 to 10 kg/mm$^2$ (from 0.49 to 98 MPa), and a yielding point of from 0.05 to 10 kg/mm$^2$ (from 0.49 to 98 MPa).

The magnetic recording medium according to the present invention comprises two or more layers. Accordingly, the amount of the binder, the amounts of the vinyl chloride resins, the polyurethane resins, the polyisocyanate or other resins contained in the binder, the molecular weight of each resin constituting a magnetic layer, the amount of polar groups, or the above-described physical properties of resins can of course be varied in a nonmagnetic layer and a magnetic layer, according to necessity. These factors should rather be optimized in each layer. Well-known techniques regarding multilayer magnetic layers can be used in the present invention. For example, when the amount of the binder is varied in each layer, it is effective to increase the amount of the binder contained in a magnetic layer to reduce scratches on the surface of a magnetic layer. For improving the head touch against head, it is effective to increase the amount of the binder in a nonmagnetic layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products formed of these isocyanates and polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive

The examples of carbon blacks for use in a magnetic layer in the present invention include furnace blacks for rubbers, thermal blacks for rubbers, carbon blacks for coloring and acetylene blacks. Carbon blacks for use in a magnetic layer in the present invention have a specific surface area ($S_{BET}$) of from 5 to 500 m$^2$/g, a DBP oil absorption amount of from 10 to 400 ml/100 g, an average particle size of from 5 to 300 nm, preferably from 10 to 250 nm, and more preferably from 20 to 200 nm, pH of from 2 to 10, a water content of from 0.1 to 10%, and a tap density of from 0.1 to 1 g/ml. The specific examples of carbon blacks for use in a magnetic layer in the present invention include BLACKPEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, RAVEN-MT-P (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of the surface may be graphitized before use. Carbon blacks may be dispersed in a binder in advance before being added to a magnetic coating solution. These carbon blacks may be used alone or in combination. Carbon blacks are preferably used in an amount of from 0.1 to 30% based on the amount of the magnetic powder. Carbon blacks can serve various functions such as preventing the static charge of a magnetic layer, reducing the friction coefficient, imparting a light-shielding property and improving film strength. Such functions vary depending upon the kind of carbon blacks to be used. Accordingly, it is of course possible in the present invention to select and determine the kinds, the amounts and the combinations of the carbon blacks to be added to an upper magnetic layer and a lower nonmagnetic layer on the basis of the above mentioned various properties, such as the particle size, the oil absorption amount, the electroconductivity and the pH value, or they should be rather optimized in each layer. Regarding carbon blacks for use in a magnetic layer in the present invention, e.g., compiled by Carbon Black Association, *Carbon Black Binran* (*Handbook of Carbon Blacks*) can be referred to.

As the abrasive which are use in the present invention, well-known materials essentially having a Mohs' hardness of 6 or more may be used alone or in combination. The examples of such abrasives include alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main components are often contained in these abrasives, but the intended effect can be attained so long as the content of the main component is 90% or more. Abrasives preferably have a particle size of from 0.01 to 2 µm, more preferably from 0.05 to 1.0 µm, and particularly preferably from 0.05 to 0.5 µm. In particular, for improving electromagnetic characteristics, abrasives having narrow particle size distribution are preferred. A plurality of abrasives each having a different particle size may be combined according to necessity for improving durability, or a single abrasive having a broad particle size distribution may be used so as to attain the same effect as such a combination. Abrasives for use in the present invention preferably have a tap density of from 0.3 to 2 g/ml, a water content of from 0.1 to 5%, a pH value of from 2 to 11 and a specific surface area ($S_{BET}$) of from 1 to 30 m$^2$/g. The figure of the abrasives for use in the present invention may be any of acicular, spherical and die-like figures. Abrasives having a figure partly with edges are preferred, because a high abrasive property can be obtained. The specific examples of abrasives for use in the present invention include AKP-12, AKP-15, AKP-20, AKP-30, AKP-50, HIT-20, HIT-30, HIT-55, HIT-60A, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenma K.K.), UB20 (manufactured by Uemura Kogyo K.K.), G-5, Chromex U2 and Chromex U1 (manufactured by Nippon Chemical Industrial Co., Ltd.), TF100 and TF140 (manufactured by Toda Kogyo Co., Ltd.), beta-Random Ultrafine (manufactured by Ibiden Co., Ltd.), and B-3 (manufactured by Showa Mining Co., Ltd.). These abrasives may be added to a nonmagnetic layer, if necessary. By adding abrasives into a nonmagnetic layer, it is possible to control the surface figure or control abrasives from protruding. The particle sizes and amounts of abrasives to be added to a magnetic layer and a nonmagnetic layer should be selected independently at optimal values.

Additive

As additives for use in a magnetic layer and a nonmagnetic layer in the present invention, those having a lubricating effect, an antistatic effect, a dispersing effect and a plasticizing effect may be used. The examples of additives which can be used in the present invention include molybdenum disulfide, tungsten disulfide, graphite, boron nitride, graphite fluoride, silicone oils, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metallic salts thereof, monobasic fatty acids having from 10 to 24 carbon atoms (which may contain an unsaturated bond or may be branched) and metallic salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), mono-fatty acid esters, di-fatty acid esters or tri-fatty acid esters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymers, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleyl, and the examples of alcohols as additives include oleyl alcohol, stearyl alcohol and lauryl alcohol. In addition to the above compounds, the examples of other additives which can be used include nonionic surfactants, e.g., alkylene oxide, glycerol, glycidol or alkylphenol-ethylene oxide adducts; cationic surfactants, e.g., cyclic amines, ester amides, quaternary ammonium salts, hydantoin derivatives, heterocyclic rings, phosphoniums or sulfoniums; anionic surfactants containing an acidic group such as carboxylic acid, sulfonic acid, phosphoric acid, a sulfate group or a phosphate group; and amphoteric surfactants, e.g., amino acids, aminosulfonic acids, sulfates or phosphates of amino alcohols, and alkylbetains. The details of these surfactants are described in *Kaimen Kasseizai Binran* (*Handbook of Surfactants*), Sangyo Tosho Co., Ltd. These lubricants and antistatic agents need not be 100% pure and may contain impurities such as isomers, non-reacted products, byproducts, decomposed products and oxides, in addition to the main components. However, the content of such impurities is preferably 30% or less, and more preferably 10% or less.

The Lubricants and surfactants for use in the present invention respectively have different physical functions. The kinds, amounts and proportions of combination generating synergistic effect of these lubricants should be determined optimally in accordance with the purpose. For example, a nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of the lubricant in an intermediate layer is made larger than the amounts in other layers so as to improve the lubricating effect. The examples are by no means limited thereto. In general, the total amount of the lubricants is from 0.1 to 50%, and preferably from 2 to 25%, based on the magnetic powder or the nonmagnetic powder.

All or a part of the additives to be used in the present invention may be added to a magnetic coating solution or a nonmagnetic coating solution in any step of the preparation. For example, additives may be blended with a magnetic powder before the kneading step, may be added during the step of kneading a magnetic powder, a binder and a solvent, may be added during the dispersing step, may be added after the dispersing step, or may be added just before coating. According to the purpose, there are cases where the object can be attained by coating all or apart of the additives simultaneously with or successively after the coating of a magnetic layer. According to the purpose, lubricants may be coated on the surface of a magnetic layer after the calendering treatment or after the completion of slitting. Well-known organic solvents can be used in the present invention, e.g., organic solvents disclosed in JP-6-68453 can be used.

Layer Construction

The thickness of a support in the magnetic recording medium according to the present invention is from 2 to 100 µm, and preferably from 2 to 80 µm. The thickness of the support for a computer tape is from 3.0 to 6.5 µm, preferably from 3.0 to 6.0 µm, and more preferably from 4.0 to 5.5 µm. The thickness of a magnetic layer is preferably from 0.03 to 0.20 µm, and more preferably from 0.05 to 0.15 µm. When the thickness of a magnetic layer is thinner than 0.03 µm, the reproduction output is too low, while when it is thicker than 0.20 µm, overwriting characteristics and resolution are deteriorated.

An under coating layer (or a subbing layer) may be provided between a support and a nonmagnetic layer or a magnetic layer for adhesion improvement. The thickness of the under coating layer is from 0.01 to 0.5 µm, and preferably from 0.02 to 0.5 µm. The magnetic recording medium in the present invention may be a disc-like medium comprising a nonmagnetic layer and a magnetic layer provided on both surface sides of a support or may be a tape-like medium or a disc-like medium comprising a nonmagnetic layer and a magnetic layer provided on either one surface side. In the latter case, a back coating layer may be provided on the surface side of the support opposite to the side having a nonmagnetic layer and a magnetic layer for the purpose of static charge prevention and curling correction. The thickness of a back coating layer is from 0.1 to 4 µm, and preferably from 0.3 to 2.0 µm. Well-known under coating layers and back coating layers can be used for this purpose.

The thickness of a nonmagnetic layer is generally from 0.2 to 5.0 µm, preferably from 0.3 to 3.0 µm, and more preferably from 1.0 to 2.5 µm. A nonmagnetic layer exhibits its effect so long as the layer is substantially nonmagnetic even if, or intentionally, it contains a small amount of a magnetic powder as an impurity, which is as a matter of course regarded as essentially the same constitution as in the present invention. The terminology substantially nonmagnetic means that the residual magnetic flux density of the layer is 0.01 T or less or the coercive force of the layer is 7.96 kA/m (100 Oe), preferably the residual magnetic flux density and the coercive force are zero.

Back Coating Layer

In general, a magnetic tape for a computer data recording is decidedly required to have an excellent repeating-running property as compared with a video tape and an audio tape. For maintaining such high running durability, it is preferred for a back coating layer to contain a carbon black and an inorganic powder.

Two kinds of carbon blacks each having a different average particle size are preferably used in combination. In this case, it is preferred to use a fine carbon black having an average particle size of from 10 to 20 nm and a coarse carbon black having an average particle size of from 230 to 300 nm in combination. In general, by the incorporation of a fine carbon black as above, the surface electrical resistance of a back coating layer and also light transmittance can be set at low values. Since there are many kinds of magnetic recording apparatuses making use of light transmittance of a tape and making it as signals of operation, the addition of fine carbon blacks is particularly effective in such a case. In addition, a fine carbon black is in general excellent in the retention of a liquid lubricant and contributes to the reduction of a friction coefficient when lubricants are used in combination. On the other hand, a coarse carbon black having a particle size of from 230 to 300 nm has a function as a solid lubricant and forms minute protrusions on the surface of a back coating layer, to thereby contribute to reduce a contact area and a friction coefficient. However, a coarse carbon black has a drawback such that, when used alone, particles are liable to fall off from the back coating layer due to the tape sliding during severe running, which leads to the increase of the error rate.

The specific examples of commercially available fine carbon blacks include RAVEN2000B (18 nm) and RAVEN1500B (17 nm) (manufactured by Columbia Carbon Co., Ltd.), BP800 (17 nm) (manufactured by Cabot Co., Ltd.), PRINTEX90 (14 nm), PRINTEX95 (15 nm), PRINTEX85 (16 nm), PRINTEX75 (17 nm) (manufactured by Degussa Co., Ltd.), and #3950 (16 nm) (manufactured by Mitsubishi Kasei Corp.).

The specific examples of commercially available coarse particle carbon blacks include THERMAL BLACK (270 nm) (manufactured by Cancarb Co., Ltd.) and RAVEN MTP (275 nm) (manufactured by Columbia Carbon Co., Ltd.).

When two kinds of carbon blacks each having a different average particle size are used in combination in a back coating layer, the proportion of the contents (by mass) of a fine carbon black having a particle size of from 10 to 20 nm and a coarse carbon black having a particle size of from 230 to 300 nm is preferably the former/the latter of from 98/2 to 75/25, and more preferably from 95/5 to 85/15.

The content of a carbon black in a back coating layer (the total amount when two kinds are used) is generally from 30 to 80 mass parts, preferably from 45 to 65 mass parts, based on 100 mass parts of the binder.

It is preferred to use two kinds of inorganic powders each having different hardness. Specifically, a soft inorganic powder having a Mohs' hardness of from 3 to 4.5 and a hard inorganic powder having a Mohs' hardness of from 5 to 9 are preferably used in combination. By the addition of a soft inorganic powder having a Mohs' hardness of from 3 to 4.5, a friction coefficient can be stabilized against repeating running. Moreover, a sliding guide pole is not scraped off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. They can be used alone or in combination of two or more.

The content of soft inorganic powders in a back coating layer is preferably from 10 to 140 mass parts (i.e., weight parts), and more preferably from 35 to 100 mass parts, based on 100 mass parts of the carbon black.

By the addition of a hard inorganic powder having a Mohs' hardness of from 5 to 9, the strength of a back coating layer is increased and running durability is improved. When such hard inorganic powders are used together with carbon blacks and the above-described soft inorganic powders, deterioration due to repeating sliding is reduced and a strong back coating layer can be obtained. Appropriate abrasive capability is imparted to a back coating layer by the addition of hard inorganic powders and the adhesion of scratched powders to a tape guide pole is reduced. In particular, when a hard inorganic powder is used in combination with a soft inorganic powder, sliding characteristics against a guide pole having a rough surface is improved and the stabilization of a friction coefficient of a back coating layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromiumoxide ($Cr_2O_3$). These hard inorganic powders may be used alone or in combination. Of the above powders, alpha-iron oxide and alpha-alumina are preferred. The content of hard inorganic powders in a back coating layer is generally from 3 to 30 mass parts, and preferably from 3 to 20 mass parts, based on 100 mass parts of the carbon black.

When soft inorganic powders and hard inorganic powders are used in combination in a back coating layer, it is preferred to use them selectively such that the difference of hardness between soft and hard inorganic powders is 2 or more, more preferably 2.5 or more, and particularly preferably 3 or more.

It is preferred that the above-described two kinds of inorganic powders each having a specific average particle size and a different Mohs' hardness and the above-described two kinds of carbon blacks each having a different specific average particle size are contained in a back coating layer.

Lubricants may be contained in a back coating layer. Lubricants can be arbitrarily selected from among the lubricants which can be used in a nonmagnetic layer or a magnetic layer as described above. The content of lubricants added to a back coating layer is generally from 1 to 5 mass parts based on 100 mass parts of the binder.

Support

Supports for use in the present invention are not particularly limited but they are preferably substantially nonmagnetic and flexible supports.

The examples of flexible supports which can be used in the present invention include well-known films such as polyesters (e.g., polyethylene terephthalate and polyethylene naphthalate), polyolefins, cellulose triacetate, polycarbonate, aromatic polyamide, aliphatic polyamide, polyimide, polyamideimide, polysulfone, and polybenzoxazole. Highly strong supports such as polyethylene naphthalate and polyamide are preferably used. If necessary, a lamination type support as disclosed in JP-A-3-224127 can be used to vary the surface roughnesses of a magnetic surface and a base surface. Supports may be subjected to surface treatments, such as corona discharge treatment, plasma treatment, easy-adhesion treatment, heat treatment, and dust removing treatment in advance. It is also possible to use an aluminum or glass substrate as a support in the present invention.

For attaining the object of the present invention, it is preferred to use a support having a central plane average surface roughness (Ra) (defined in JIS B 0601) of 8.0 nm or less, preferably 4.0 nm or less, and more preferably 2.0 nm or less, measured by TOPO-3D (a product manufactured by WYKO Co., Ltd., U.S.A.). It is preferred that a support not only has a small central plane average surface roughness but also is free from coarse protrusions having a height of 0.5 µm or more. Surface roughness configuration is freely controlled by the size and the amount of fillers added to a support. The examples of such fillers include acryl-based organic fine powders, as well as oxides or carbonates of Ca, Si and Ti. A support for use in the present invention preferably has a maximum height (Rmax) of 1 µm or less, ten point average roughness (Rz) of 0.5 µm or less, central plane peak height (Rp) of 0.5 µm or less, central plane valley depth (Rv) of 0.5 µm or less, central plane area factor (Sr) of from 10 to 90%, and average wavelength (Xa) of from 5 to 300 µm. For obtaining desired electromagnetic characteristics and durability, surface protrusion distribution of a support can be controlled arbitrarily by fillers, e.g., the number of protrusions of sizes of from 0.01 to 1 µm can be controlled each within the range of from 0 to 2,000 per 0.1 $mm^2$. A support for use in the present invention has an F-5 value of preferably from 5 to 50 $kg/mm^2$ (from 49 to 490 MPa), a thermal shrinkage factor of a support at 100° C. for 30 minutes of preferably 3% or less, more preferably 1.5% or less, and a thermal shrinkage factor at 80° C. for 30 minutes of preferably 1% or less, more preferably 0.5% or less. A support has a breaking strength of from 5 to 100 $kg/mm^2$ (from 49 to 980 MPa), an elastic modulus of from 100 to 2,000 $kg/mm^2$ (from 0.98 to 19.6 GPa), a temperature expansion coefficient of from $10^{-4}$ to $10^{-8}/°$ C., preferably from $10^{-5}$ to $10^{-6}/°$ C., and a humidity expansion coefficient of $10^{-4}$/RH % or less, preferably $10^{-5}$/RH % or less. These thermal characteristics, dimensional characteristics and mechanical strength characteristics are preferably almost equal in every direction of in-plane of a support with the difference of 10% or less.

Producing Method

Processes of preparing magnetic layer and lower layer coating solutions for use in the magnetic recording medium of the present invention comprise at least a kneading step, a dispersing step and, optionally, blending steps to be carried out before and/or after the kneading and dispersing steps. Each of these steps may be composed of two or more separate stages. Materials such as a magnetic powder, a nonmagnetic powder, a binder, a carbon black, an abrasive, an antistatic agent, a lubricant and a solvent for use in the present invention may be added in any step at any time, and each material may be added in two or more separate steps. For example, polyurethane can be added dividedly in a kneading step, a dispersing step, or a blending step for adjusting viscosity after dispersion. For achieving the object of the present invention, the above steps can be performed partly with conventional producing techniques. It is preferred to use powerful kneading machines such as an open kneader, a continuous kneader, a pressure kneader or an extruder in a kneading step. When a kneader is used, a magnetic powder or a nonmagnetic powder and all or a part of a binder (preferably 30% or more of the total binders) are kneading-treated in the range of from 15 to 500 parts per 100 parts of the magnetic powder. Details of kneading are disclosed in JP-A-1-106338 and JP-A-1-79274. When a magnetic layer solution and a nonmagnetic layer solution are dispersed, glass beads can be used but dispersing media having a high specific gravity are preferably used, e.g., zirconia beads, titania beads and steel beads are suitable for this purpose. Optimal particle size and packing density of these dispersing media should be selected. Known dispersing apparatuses can be used in the present invention.

The following methods are preferably used for coating a magnetic recording medium having a multilayer constitution in the present invention. As the first method, a lower layer is coated by any of gravure coating, roll coating, blade coating, and extrusion coating apparatuses, which are generally used in the coating of a magnetic coating solution, and then an upper layer is coated while the lower layer is still wet by means of a support pressing type extrusion coating apparatus as disclosed in JP-B-1-46186 (the term "JP-B" as used herein means an "examined Japanese patent publication"), JP-A-60-238179 and JP-A-2-265672. As the second method, an upper layer and a lower layer are coated almost simultaneously using a coating head equipped with two slits for feeding coating solution as disclosed in JP-A-63-88080, JP-A-2-17971 and JP-A-2-265672. As the third method, an upper layer and a lower layer are coated almost simultaneously using an extrusion coating apparatus equipped with a backup roll as disclosed in JP-A-2-174965. For preventing the electromagnetic characteristics of a magnetic recording medium from deteriorating due to agglomeration of magnetic powders, it is preferred to give shear to the coating solution in a coating head by the methods as disclosed in JP-A-62-95174 and JP-A-1-236968. With respect to the viscosity of a coating solution, the range of the numeric values disclosed in JP-A-3-8471 is necessary to be satisfied. For realizing the constitution of the present invention, a successive multilayer coating method of coating a lower layer, drying the lower layer and successively coating a magnetic layer on the lower layer can of course be used without impairing the effect of the present invention. However, for reducing coating defects and improving quality, e.g., the reduction of dropout, it is preferred to use the above simultaneous multilayer coating method.

In the case of a magnetic disc, isotropic orientation can be sufficiently achieved in some case without performing orientation using an orientation apparatus, but it is preferred to use well-known random orientation apparatuses, e.g., disposing cobalt magnets diagonally and alternately or applying an alternating current magnetic field using a solenoid. Isotropic orientation in ferromagnetic metal powders is in general preferably in-plane two dimensional random orientation, but it may be three dimensional random orientation having perpendicular factors. Hexagonal ferrites in general have an inclination for three dimensional random orientation of in-plane and in the perpendicular direction but it can be made in-plane two dimensional random orientation. It is also possible to impart to hexagonal ferrites isotropic magnetic characteristics in the circumferential direction by perpendicular orientation using well-known methods, e.g., using heteropolar-facing magnets. Perpendicular orientation is preferred particularly when a disc is used for high density recording. Circumferential orientation can be performed using spin coating.

In the case of a magnetic tape, orientation is performed in the machine direction using a cobalt magnet and a solenoid. In orientation, it is preferred that the drying position of the coated film can be controlled by controlling the temperature and the amount of drying air and coating velocity. Coating velocity is preferably from 20 to 1,000 m/min. and the temperature of drying air is preferably 60° C. or more. Appropriately preliminary drying can also be performed before entering a magnet zone.

A magnetic recording medium is generally subjected to calendering treatment after coating and drying. Heat resisting plastic rollers such as epoxy, polyimide, polyamide and polyimideamide rollers, or metal rollers are used for calendering treatment. Metal rollers are preferably used for the treatment particularly when magnetic layers are coated on both surface sides. Treatment temperature is preferably 50° C. or more, and more preferably 100° C. or more. Linear pressure is preferably 200 kg/cm (196 kN/m) or more, and more preferably 300 kg/cm (294 kN/m) or more.

Physical Properties

The saturation magnetic flux density of the magnetic layer of the magnetic recording medium according to the present invention is preferably from 0.1 to 0.3 T. The coercive force (Hc) of the magnetic layer is preferably from 159 kA/m (2,000 Oe) to 398 kA/m (5,000 Oe), and more preferably from 159 to 239 kA/m (from 2,000 to 3,000 Oe). Coercive force distribution is preferably narrow, and SFD is preferably 0.6 or less.

The squareness ratio of a magnetic disc is from 0.55 to 0.67, preferably from 0.58 to 0.64, in the case of two dimensional random orientation; from 0.45 to 0.55 in the case of three dimensional random orientation; 0.6 or more in the perpendicular direction, preferably 0.7 or more, in the case of perpendicular orientation; and when demagnetization field correction is performed, the squareness ratio is 0.7 or more, preferably 0.8 or more. Degree of orientation is preferably 0.8 or more in both cases of two dimensional random orientation and three dimensional random orientation. In the case of two dimensional random orientation, the squareness ratio, Br and Hc in the perpendicular direction are preferably from 0.1 to 0.5 times as small as those in the in-plane direction.

In the case of a magnetic tape, the squareness ratio is generally 0.55 or more, and preferably 0.7 or more.

The magnetic recording medium in the present invention has a friction coefficient against head at temperature of from −10° C. to 40° C. and humidity of from 0% to 95% of 0.5 or less, preferably 0.3 or less, a surface intrinsic resistivity of the magnetic surface of preferably from $10^4$ to $10^{12}$ ohm/sq, a chargeability of preferably from −500 V to +500 V, an elastic modulus at 0.5% elongation of a magnetic layer of preferably from 100 to 2,000 kg/mm² (from 0.98 to 19.6 GPa) in every direction of in-plane, a breaking strength of preferably from 10 to 70 kg/cm² (from 98 to 686 MPa), an elastic modulus of preferably from 100 to 1,500 kg/mm² (from 0.98 to 14.7 GPa) in every direction of in-plane, a residual elongation of preferably 0.5% or less, and a thermal shrinkage factor at every temperature of 100° C. or less of preferably 1% or less, more preferably 0.5% or less, and most preferably 0.1% or less. The glass transition temperature of a magnetic layer (the maximum of loss elastic modulus on dynamic visco-elasticity measurement at 110 Hz) is preferably from 50° C. to 120° C., and that of a lower nonmagnetic layer is preferably from 0° C. to 100° C. The loss elastic modulus is preferably within the range of from $1 \times 10^9$ to $8 \times 10^{10}$ μN/cm², and loss tangent is preferably 0.2 or less. If loss tangent is too great, adhesion failure is liable to occur. These thermal and mechanical characteristics are preferably almost equal in every direction of in-plane of the medium within difference of 10% or less. The residual amount of solvent in a magnetic layer is preferably 100 mg/m² or less, and more preferably 10 mg/m² or less. The void ratio is preferably 30% by volume or less, and more preferably 20% by volume or less, with both of a nonmagnetic layer and a magnetic layer. The void ratio is preferably smaller for obtaining high output but a specific value should be preferably secured depending upon purposes in some cases. For example, in a disc-like medium which is repeatedly used, large void ratio contributes to good running durability in many cases.

A magnetic layer preferably has a central plane average surface roughness (Ra) (defined in JIS B 0601) of 4.0 nm or less, preferably 3.8 nm or less, and more preferably 3.5 nm or less, on measuring an area of about 250 $\mu$m×250 $\mu$m using TOPO-3D (a product manufactured by WYKO Co., Ltd., U.S.A.). A magnetic layer for use in the present invention preferably has a maximum height (Rmax) of 0.5 $\mu$m or less, a ten point average roughness (Rz) of 0.3 $\mu$m or less, a central plane peak height (Rp) of 0.3 $\mu$m or less, a central plane valley depth (Rv) of 0.3 $\mu$m or less, a central plane area factor (Sr) of from 20% to 80%, and an average wavelength (Xa) of from 5 to 300 $\mu$m. It is preferred to optimize electromagnetic characteristics and friction coefficient by setting surface protrusions of a magnetic layer within the above described range. These characteristics can be easily controlled by controlling the surface property of a magnetic layer by fillers in a support, controlling the particle size and the amount of a magnetic powder added to a magnetic layer, or varying the surface configuration of the rollers used in calendering treatment. Curling is preferably within the range of ±3 mm.

When the magnetic recording medium according to the present invention comprises a nonmagnetic layer and a magnetic layer, these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer, to thereby improve the head touching of the magnetic recording medium.

EXAMPLE

| <Preparation of Coating Solution> | |
|---|---|
| Magnetic coating solution 1 (disc) | |
| Ba ferrite powder | 100 parts |
| Average tabular diameter: 30 nm | |
| Average tabular ratio: 3 | |
| Specific surface area ($S_{BET}$): 52 m$^2$/g | |
| Hc: 2,300 Oe (184 kA/m) | |
| $\sigma_s$: 54 A · m$^2$/kg | |
| Vinyl chloride copolymer | 10 parts |
| MR555 (manufactured by Nippon Zeon Co., Ltd.) | |
| Diamond fine particles | 1.5 parts |
| Average particle size: 0.20 $\mu$m | |
| Carbon black | 0.5 parts |
| #55 (manufactured by Asahi Carbon Co., Ltd.) | |
| Isohexadecyl stearate | 5 parts |
| Stearic acid | 1 part |
| Oleic acid | 1 part |
| Methyl ethyl ketone | 120 parts |
| Cyclohexanone | 80 parts |
| Magnetic coating solution 2 (tape) | |
| Ba ferrite powder | 100 parts |
| Average tabular diameter: 30 nm | |
| Average tabular ratio: 3 | |
| $S_{BET}$: 52 m$^2$/g | |
| Hc: 2,500 Oe (200 kA/m) | |
| $\sigma_s$: 51 A · m$^2$/kg | |
| Vinyl chloride copolymer | 10 parts |

| -continued | |
|---|---|
| <Preparation of Coating Solution> | |
| MR555 (manufactured by Nippon Zeon Co., Ltd.) | |
| α-Alumina | 8 parts |
| HIT60A (manufactured by Sumitomo Chemical Co., Ltd.) | |
| Carbon black | 0.5 parts |
| #55 (manufactured by Asahi Carbon Co., Ltd.) | |
| Average particle size: 0.015 $\mu$m | |
| Stearic acid | 0.5 parts |
| Butyl stearate | 2 parts |
| Methyl ethyl ketone | 180 parts |
| Cyclohexanone | 100 parts |
| Nonmagnetic coating solution 1 | |
| (for nonmagnetic layer, disc) | |
| Nonmagnetic powder, alpha-iron oxide | 100 parts |
| Average long axis length: 0.09 $\mu$m | |
| $S_{BET}$: 50 m$^2$/g | |
| pH: 7 | |
| DBP oil absorption amount: 27 to 38 ml/100 g | |
| Surface-covering compound: Al$_2$O$_3$, 8 mass % | |
| Carbon black | 25 parts |
| CONDUCTEX SC-U (manufactured by Columbia Carbon Co., Ltd.) | |
| Vinyl chloride copolymer | 13 parts |
| MR104 (manufactured by Nippon Zeon Co., Ltd.) | |
| Polyurethane resin | 5 parts |
| UR 8200 (manufactured by Toyobo Co., Ltd.) | |
| Phenylphosphonic acid | 3.5 parts |
| Isohexadecyl stearate | 6 parts |
| Oleic acid | 1.3 parts |
| Stearic acid | 1.3 parts |
| Methyl ethyl ketone | 230 parts |
| Cyclohexanone | 155 parts |
| Nonmagnetic coating solution 2 | |
| (for nonmagnetic layer, tape) | |
| Nonmagnetic powder, alpha-iron oxide | 100 parts |
| Average long axis length: 0.09 $\mu$m | |
| $S_{BET}$: 50 m$^2$/g | |
| pH: 7 | |
| DBP oil absorption amount: 27 to 38 ml/100 g | |
| Surface-covering compound: Al$_2$O$_3$, 8 mass % | |
| Carbon black | 25 parts |
| CONDUCTEX SC-U (manufactured by Columbia Carbon Co., Ltd.) | |
| Vinyl chloride copolymer | 13 parts |
| MR104 (manufactured by Nippon Zeon Co., Ltd.) | |
| Polyurethane resin | 5 parts |
| UR 8200 (manufactured by Toyobo Co., Ltd.) | |
| Phenylphosphonic acid | 3.5 parts |
| Butyl stearate | 1 part |
| Stearic acid | 2 parts |
| Methyl ethyl ketone | 205 parts |
| Cyclohexanone | 135 parts |

Preparation Method 1: Disc (Disc No.1 to No. 8)

Preparation of Disc No. 1

With each of the above compositions of magnetic coating solution 1 and nonmagnetic coating solution 1, components were blended in a kneader, and then dispersed in a sand mill for 10 hours. Polyisocyanate (6.5 parts) was added to the nonmagnetic layer coating solution. Further, 7 parts of methyl ethyl ketone was added to nonmagnetic layer coating solution, and each solution was filtered through a filter having an average pore diameter of 1 $\mu$m, thereby coating solutions for forming a nonmagnetic layer and a magnetic layer for a disc were obtained.

The thus-obtained coating solution for forming a nonmagnetic layer was coated on a polyethylene terephthalate support having a thickness of 62 $\mu$m in a dry coating thickness of 1.5 $\mu$m, and the coated layer was subjected to drying and then calendering treatment. The coating solution for forming a magnetic layer was successively multilayer-coated on the nonmagnetic layer in a dry thickness of 0.2 µm. After drying, the coated layer was subjected to calendering treatment with a calendar of seven stages at 90° C. and linear pressure of 300 kg/cm (294 kN/m). The same operations were also performed on the other side of the support. The thus-obtained web was punched to a disc of 3.5 inches and the disc was subjected to surface treatment by abrasives, thereby disc No. 1 was obtained.

Preparation of Disc No. 2 to No. 8

Disc No. 2 was prepared in the same manner as in the preparation of disc No. 1 except that 20 liters of distilled water per kg of the Ba ferrite powder was added, the composition was stirred for 10 hours for dispersion, and the system was subjected to surface treatment of 2 mass % in terms of aluminum hydroxide. After the surface treatment, the system was washed with 100 liters of distilled water and then dried.

Disc No. 3 was prepared in the same manner as in the preparation of disc No. 2 except for changing the dispersion time in a sand mill to 7 hours.

Disc No. 4 was prepared in the same manner as in the preparation of disc No. 3 except for using a resin having carboxylic acid functional groups in place of MR555.

Disc No. 5 was prepared in the same manner as in the preparation of disc No. 3 except that washing with 300 liters of distilled water was performed after the surface treatment of the Ba ferrite powder used in the preparation of disc No. 2.

Disc No. 6 was prepared in the same manner as in the preparation of disc No. 5 except that washing with 100 liters of a solution of 0.1 equivalent acetic acid was carried out in addition to the washing of the Ba ferrite powder performed in disc No. 5.

Disc No. 7 was prepared in the same manner as in the preparation of disc No. 1 except that a Ba ferrite powder having an $S_{BET}$ of 36 m$^2$/g was used.

Disc No. 8 was prepared in the same manner as in the preparation of disc No. 1 except that a Ba ferrite powder having an $S_{BET}$ of 68 m$^2$/g was used.

Disc No. 9 was prepared in the same manner as in the preparation of disc No. 6 except that a Ba ferrite powder having an $S_{BET}$ of 68 m$^2$/g was used.

Preparation Method 2: Computer Tape (Tape No.1 to No. 4)

Preparation of Tape No. 1

With each of the above compositions of magnetic coating solution 2 and nonmagnetic coating solution 2, components were blended in a kneader, and then dispersed in a sand mill for 10 hours. Polyisocyanate (2.5 parts) was added to the nonmagnetic layer coating solution. Further, 3 parts of methyl ethyl ketone was added to nonmagnetic layer coating solution, and each solution was filtered through a filter having an average pore diameter of 1 µm, thereby coating solutions for forming a nonmagnetic layer and a magnetic layer for a tape were obtained.

The thus-obtained coating solutions for forming a nonmagnetic layer and a magnetic layer were simultaneously multilayer-coated on a polyethylene terephthalate support. The nonmagnetic layer-forming coating solution was coated in a dry thickness of 1.5 µm, and the magnetic layer-forming coating solution was coated in a dry thickness of 0.15 µm. Both layers were subjected to orientation with a cobalt magnet having a magnetic force of 600 mT and a solenoid having a magnetic force of 600 mT while both layers were still wet. After drying, the coated layers were subjected to calendering treatment with a calendar of seven stages comprising metal rolls alone at 90° C., linear pressure of 300 kg/cm (294 kN/m). Subsequently, a back coating layer (100 parts of a carbon black having an average particle size of 17 nm, 80 parts of calcium carbonate having an average particle size of 40 µm, and 5 parts of alpha-alumina having an average particle size of 200 nm were dispersed in a nitrocellulose resin, a polyurethane resin and a polyisocyanate) having a thickness of 0.5 µm was coated. The obtained web was slit to a width of 3.8 mm. The magnetic layer surface of the strip was cleaned with a tape cleaning apparatus having a delivery and a winding-up movement of a slit product to which a nonwoven fabric and a razor blade are attached so as to be pressed against the surface of the tape. Thus, a sample of tape No. 1 was obtained.

Preparation of Tape No. 2 to No. 4

Tape No. 2 was prepared in the same manner as in the preparation of tape No. 1 except that 20 liters of distilled water per kg of the Ba ferrite powder was added, and after stirring for dispersion for 10 hours, surface treatment of 2 mass % in terms of aluminum hydroxide was performed, and the dispersion time in a sand mill was changed to 7 hours.

Tape No. 3 was prepared in the same manner as in the preparation of tape No. 1 except that a Ba ferrite powder having an $S_{BET}$ of 68 m$^2$/g was used.

Tape No. 4 was prepared in the same manner as in the preparation of tape No. 2 except that a Ba ferrite powder having an $S_{BET}$ of 68 m$^2$/g was used.

Each sample of discs and tapes prepared above was evaluated as follows, and the results obtained are shown in Table 1 below.

(1) Ba Concentration

A strip of a magnetic recording medium of 0.05 m$^2$ was cut out and put in a 200 ml beaker with 100 ml of distilled water, the beaker was covered with a watch glass and retained in a constant temperature bath at 75° C. for 3 hours to gather extract. The Ba concentration of the extract was measured with ICP SPA 1200A (manufactured by Seiko Instruments Inc.). Ba concentration was calculated in terms of m$^2$ of the magnetic recording medium.

(2) Reduction of Output, Dropout (Disc)

A recording head (MIG, gap length: 0.15 µm, 1.8 T) and an MR head for reproduction were fit to a spin stand before measurement. Linear recording density was 150 kfci, a track width was 2 µm, rotation was 3,500 rpm, and radius was 30 mm.

With the sample not accompanied by the reduction of output, the number of dropout generated in one track of reproduction was counted by a dropout counter in the atmosphere of 23° C., 50% RH.

(3) Reduction of Output, Dropout (Tape)

A recording head (MIG, gap length: 0.15 µm, 1.8 T) and an MR head for reproduction were fit to a drum tester before measurement. Recording wavelength was 0.2 µm and a head-medium relative velocity was 15 m/sec.

With the sample not accompanied by the reduction of output, the number of dropout generated in one track of reproduction was counted by a dropout counter in the atmosphere of 23° C., 50% RH.

TABLE 1

Results of Evaluations of Magnetic Recording Media

| Sample No. | Remarks | $S_{BET}$ of Ba Ferrite Powder ($m^2/g$) | Ba Concentration ($ppm/m^2$) | Reduction of Output (dB) | Dropout (number/10 sec.) | Other Nonconformity |
|---|---|---|---|---|---|---|
| Disc No. 1 | Comparison | 52 | 35 | −3 | — | Head clogging |
| Disc No. 2 | Comparison | 52 | 25 | 0 | 50 | |
| Disc No. 3 | Example | 52 | 10 | 0 | 10 | |
| Disc No. 4 | Comparison | 52 | 24 | −1 | — | |
| Disc No. 5 | Example | 52 | 3 | 0 | 5 | |
| Disc No. 6 | Example | 52 | 1 | 0 | 2 | |
| Disc No. 7 | Example | 36 | 15 | 0 | 10 | |
| Disc No. 8 | Comparison | 68 | 43 | −2 | — | Head clogging |
| Disc No. 9 | Example | 68 | 4 | 0 | 3 | |
| Tape No. 1 | Comparison | 52 | 37 | −2 | — | |
| Tape No. 2 | Example | 52 | 4 | 0 | 5 | |
| Tape No. 3 | Comparison | 68 | 45 | −3 | — | Head clogging |
| Tape No. 4 | Example | 68 | 3 | 0 | 2 | |

It is apparent from the results shown in Table 1 that the samples according to the present invention are not accompanied by the generation of nonconformities, such as the reduction of output, dropout and others.

EFFECT OF THE INVENTION

According to the present invention, the conditions of the preparation of a Ba ferrite powder and a coating solution can be designed variously by making the Ba concentration of a magnetic recording medium obtained by the condition of the present invention as the standard, and a magnetic recording medium excellent in storage stability can be obtained. Further, the present invention can be used as the means of quality control of such a magnetic recording medium.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided thereon a magnetic layer containing a barium ferrite powder dispersed in a binder, wherein the barium ferrite powder has $S_{BET}$ of 40–80 $m^2/g$, wherein the barium ferrite powder is subjected to surface treatment with oxides or hydroxide of Si, Al or P, silane coupling agents, or titanium coupling agent in an amount of from 0.1 to 10 weight %, and is washed with water or weak acid after the surface treatment, the binder has a —$SO_3M$ group wherein M represents a hydrogen atom or an alkali metal salt group and the concentration of Ba of the extract obtained by the following condition is 20 ppm or less per $m^2$ of the magnetic recording medium:

condition: 0.05 $m^2$ of the magnetic recording medium is arbitrarily cut out and put in a 200 ml beaker with 100 ml of distilled water, the beaker is covered with a watch glass and retained in a constant temperature bath at 75° C. for 3 hours.

2. The magnetic recording medium as in claim 1, wherein the barium ferrite powder is subjected to wash treatment with weak acid or water, in advance of said surface treatment.

3. The magnetic recording medium as in claim 1, wherein the barium ferrite powder has a pH of from about 6 to about 11 and a water content of 0.01 to 2.0 weight %.

* * * * *